(12) United States Patent
Floyd et al.

(10) Patent No.: US 8,677,738 B2
(45) Date of Patent: Mar. 25, 2014

(54) PRE-INJECTION EXHAUST FLOW MODIFIER

(75) Inventors: Ryan A. Floyd, Mason, MI (US); Stephen M. Thomas, Laingsburg, MI (US); Joseph G. Ralph, Owosso, MI (US); James J. Reynolds, III, Ypsilanti, MI (US); Jeremy Popovich, Brooklyn, MI (US); Manoj K. Sampath, Ann Arbor, MI (US); Michael Wenk, White Lake, MI (US); Alison Chambers, Garden City, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 265 days.

(21) Appl. No.: 13/227,952

(22) Filed: Sep. 8, 2011

(65) Prior Publication Data
US 2013/0061577 A1   Mar. 14, 2013

(51) Int. Cl.
*F01N 3/00*   (2006.01)

(52) U.S. Cl.
USPC ................................. 60/295; 60/311; 60/324

(58) Field of Classification Search
USPC ............................ 60/295, 311, 317, 319, 324
See application file for complete search history.

(56) References Cited

U.S. PATENT DOCUMENTS

| | | | |
|---|---|---|---|
| 3,958,757 A | 5/1976 | Happel et al. | |
| 4,292,947 A | 10/1981 | Tanasawa et al. | |
| 4,742,964 A | 5/1988 | Ito et al. | |
| 4,805,837 A | 2/1989 | Brooks et al. | |
| 5,307,997 A | 5/1994 | Wakeman | |
| 5,406,790 A * | 4/1995 | Hirota et al. | 60/276 |
| 5,522,218 A | 6/1996 | Lane et al. | |
| 5,570,841 A | 11/1996 | Pace et al. | |
| 5,605,042 A | 2/1997 | Stutzenberger | |
| 5,713,327 A | 2/1998 | Tilton et al. | |
| 5,924,280 A | 7/1999 | Tarabulski | |
| 5,976,475 A | 11/1999 | Peter-Hoblyn et al. | |
| 6,063,350 A | 5/2000 | Tarabulski et al. | |
| 6,470,676 B2 | 10/2002 | Dolling et al. | |
| 6,539,708 B1 | 4/2003 | Hofmann et al. | |
| 6,708,904 B2 | 3/2004 | Itatsu | |
| 6,742,330 B2 | 6/2004 | Genderen | |
| 7,100,366 B2 | 9/2006 | Hager et al. | |
| 7,434,570 B2 | 10/2008 | Hill | |
| 7,775,322 B2 | 8/2010 | Hill | |
| 2002/0001554 A1 | 1/2002 | Czarnik et al. | |
| 2008/0083218 A1 * | 4/2008 | Abram et al. | 60/324 |
| 2008/0245063 A1 | 10/2008 | Hill | |

(Continued)

FOREIGN PATENT DOCUMENTS

| | | |
|---|---|---|
| DE | 2418227 | 10/1975 |
| DE | 10241697 | 4/2003 |

(Continued)

*Primary Examiner* — Thomas Denion
*Assistant Examiner* — Philip Eklem
(74) *Attorney, Agent, or Firm* — Harness, Dickey & Pierce, P.L.C.

(57) ABSTRACT

An exhaust gas treatment system for reducing emissions from an engine includes an exhaust conduit adapted to supply an exhaust stream from the engine to an exhaust treatment device. The conduit includes an aperture. An injector injects a reagent through the aperture and into the exhaust stream. A flow modifier is positioned within the exhaust conduit upstream of the injector. The flow modifier includes a diverter for increasing the velocity of the exhaust gas at a predetermined location within the conduit relative to the injected reagent.

6 Claims, 6 Drawing Sheets

(56) References Cited

U.S. PATENT DOCUMENTS

| | | |
|---|---|---|
| 2009/0179087 A1 | 7/2009 | Martin et al. |
| 2009/0241906 A1* | 10/2009 | Osbat et al. ............... 123/470 |
| 2009/0266064 A1 | 10/2009 | Zheng et al. |
| 2010/0005791 A1* | 1/2010 | Ranganathan et al. ......... 60/310 |
| 2011/0061969 A1 | 3/2011 | Hill et al. |

FOREIGN PATENT DOCUMENTS

| | | |
|---|---|---|
| EP | 0711609 | 5/1996 |
| EP | 1111231 | 6/2001 |
| JP | 11-166410 | 6/1999 |
| JP | 2003-328735 | 11/2003 |
| JP | 2004-324585 | 11/2004 |
| JP | 2007-332797 | 12/2007 |

* cited by examiner

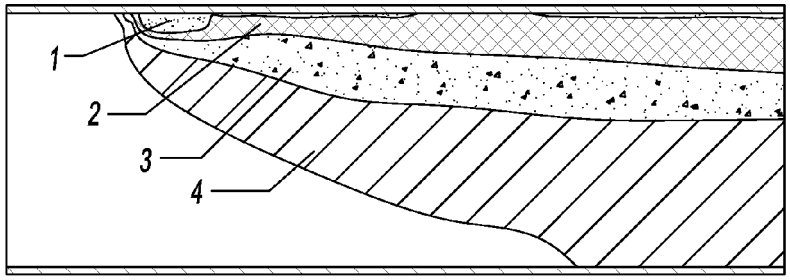
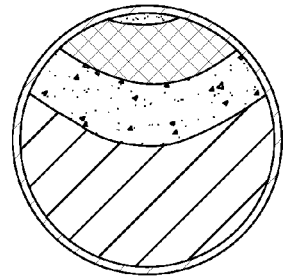

Mass Fraction of Reagent (No Flow Modifier)

*Fig-5*

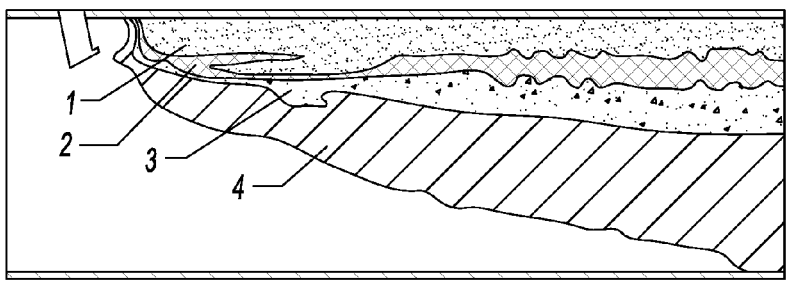
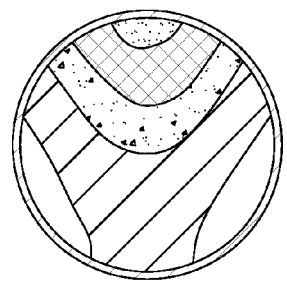

Mass Fraction of Reagent (With Flow Modifier)

*Fig-7*

Area 1 ($6.4 \times 10^{-4}$ - $8.0 \times 10^{-4}$)  Area 3 ($3.2 \times 10^{-4}$ - $5.2 \times 10^{-4}$)
Area 2 ($5.2 \times 10^{-4}$ - $6.4 \times 10^{-4}$)  Area 4 ($1.2 \times 10^{-4}$ - $3.2 \times 10^{-4}$)

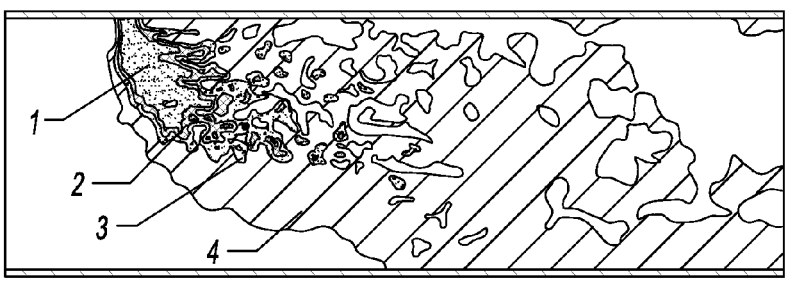

Simulated Spray Concentration of Droplets (No Flow Modifier)

*Fig-6*

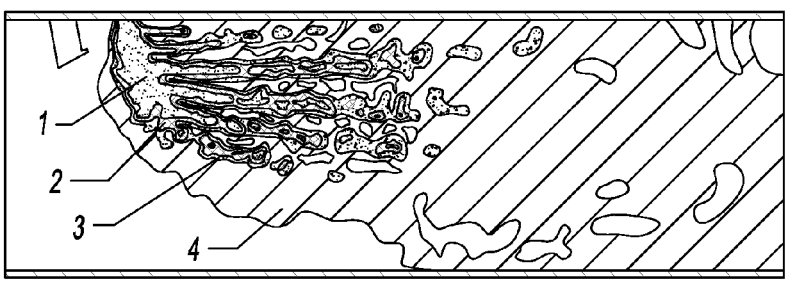

Simulated Spray Concentration of Droplets (With Flow Modifier)

*Fig-8*

Area 1 ($8.5 \times 10^{-3}$ - $1.0 \times 10^{-2}$)  Area 3 ($4.0 \times 10^{-3}$ - $6.5 \times 10^{-3}$)
Area 2 ($6.5 \times 10^{-3}$ - $8.5 \times 10^{-3}$)  Area 4 ($1.0 \times 10^{-3}$ - $4.0 \times 10^{-3}$)

PRE-INJECTION EXHAUST FLOW MODIFIER

FIELD

The present disclosure relates to exhaust gas treatment systems. More particularly, an exhaust gas flow modifier is provided upstream from a reagent injector to enhance fixing and distribution of the reagent within the engine exhaust stream.

BACKGROUND

This section provides background information related to the present disclosure which is not necessarily prior art.

To reduce the quantity of undesirable particulate matter and $NO_x$ emitted to the atmosphere during internal combustion engine operation, a number of exhaust aftertreatment systems have been developed. The need for exhaust aftertreatment systems particularly arises when diesel combustion processes are implemented.

One method used to reduce $NO_x$ emissions from internal combustion engines is known as selective catalytic reduction (SCR). SCR may include injecting a reagent into the exhaust stream of the engine to form a reagent and exhaust gas mixture that is subsequently passed through a reactor containing a catalyst, such as, activated carbon, or metals, such as platinum, vanadium, or tungsten, which are capable of reducing the $NO_x$ concentration in the presence of the reagent.

An aqueous urea solution is known to be an effective reagent in SCR systems for diesel engines. However, use of an aqueous solution and other reagents may include disadvantages. Urea is highly corrosive and attacks mechanical components of the SCR system. Urea also tends to solidify upon prolonged exposure to high temperatures, such as encountered in diesel exhaust systems. A concern exists because the reagent that creates a deposit is not used to reduce the $NO_x$.

In addition, if the reagent is not properly mixed with the exhaust gas, the reagent is not efficiently utilized, inhibiting the action of the catalyst and thereby reducing the SCR system's effectiveness. High reagent injection pressures have been used as a method of minimizing the problem of insufficient atomization of the urea mixture. However, high injection pressures may result in over-penetration of the injected spray plume into the exhaust stream thereby causing the plume to impinge on the inner surface of the exhaust pipe opposite the injector. Over-penetration leads to inefficient use of the urea mixture and may reduce the range over which the vehicle may be operated with reduced $NO_x$ emissions. Only a finite amount of reagent may be carried in a vehicle. It is desirable to efficiently use the stored reagent to maximize vehicle range and reduce the need for replenishing the reagent.

It may be advantageous to provide methods and apparatus for injecting a reagent into the exhaust stream of an internal combustion engine to minimize reagent deposition and improve the mixing of the reagent with the exhaust gas.

SUMMARY

This section provides a general summary of the disclosure, and is not a comprehensive disclosure of its full scope or all of its features.

An exhaust gas treatment system for reducing emissions from an engine includes an exhaust conduit adapted to supply an exhaust stream from the engine to an exhaust treatment device. The conduit includes an aperture. An injector injects a reagent through the aperture and into the exhaust stream. A flow modifier is positioned within the exhaust conduit upstream of the injector. The flow modifier includes a diverter for increasing the velocity of the exhaust gas at a predetermined location within the conduit relative to the injected reagent.

An exhaust gas stream flow modifier is provided for an exhaust gas treatment system including an exhaust conduit and an injector for injecting a reagent into an exhaust stream. The flow modifier includes a mount adapted to fix the injector to the conduit. The mount includes an aperture through which reagent is injected. A diverter is coupled to one of the mount and the conduit, adapted to be positioned within the conduit, and offset from an inner surface of the conduit. The diverter is positioned upstream from the reagent injection aperture and inclined at an angle to increase a velocity of the exhaust at a predetermined location within the conduit to reduce reagent impingement on the conduit inner surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 depicts a computational fluid dynamics model of the mass fraction of reagent in a conduit without a flow modifier;

FIG. 6 is a computational fluid dynamics contour depicting a simulated spray concentration of droplets for reagent injected within a conduit without a pre-injection exhaust flow modifier;

FIG. 7 depicts a computational fluid dynamics model of the mass fraction of reagent in a conduit with a flow modifier;

FIG. 8 is a computational fluid dynamics contour depicting a simulated spray concentration of droplets for reagent injected within a conduit with a pre-injection exhaust flow modifier;

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of $NO_x$ emissions, the present teachings can be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Patent Application Publication No. 2009/0179087A1, filed Nov. 21, 2008, entitled "Method And Apparatus For Injecting Atomized Fluids", which is incorporated herein by reference.

Figure 1:
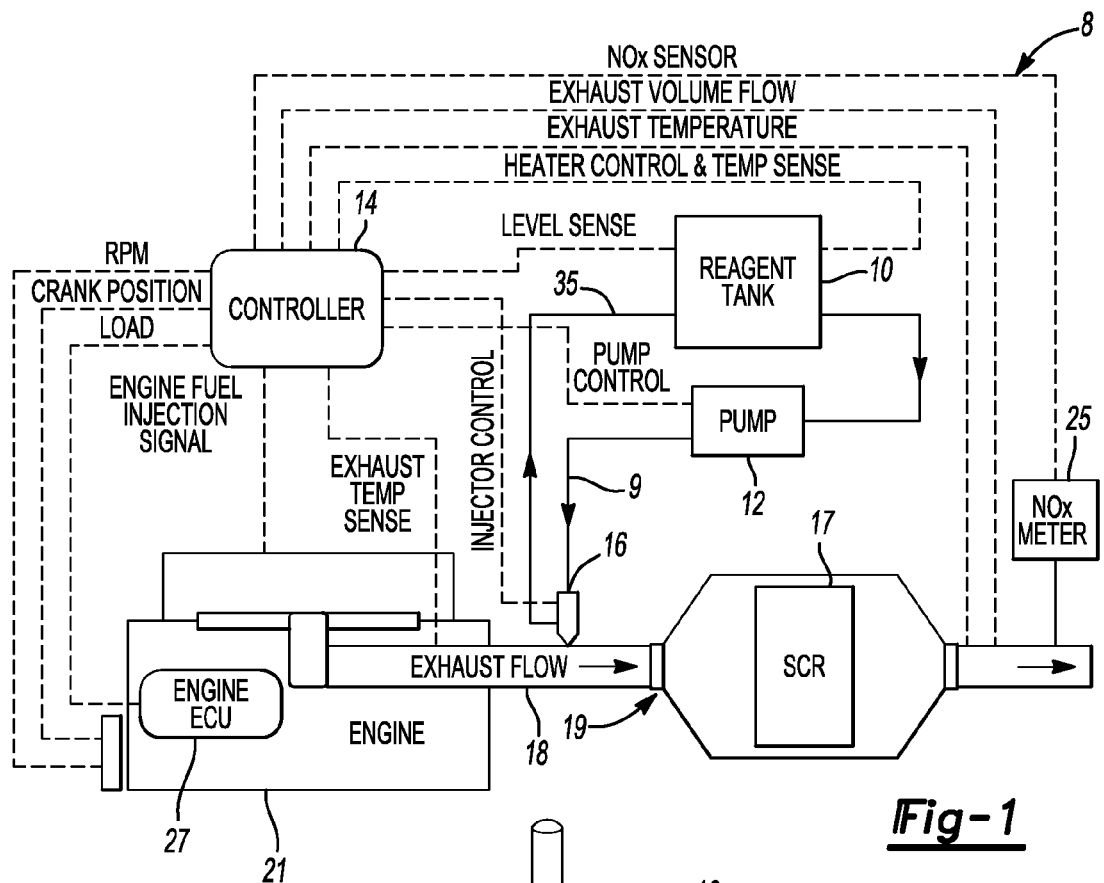
FIG. 1 depicts a schematic diagram of an exemplary internal combustion engine with an emissions control system equipped with a pre-injection exhaust flow modifier according to the present teachings.
Figure 2:
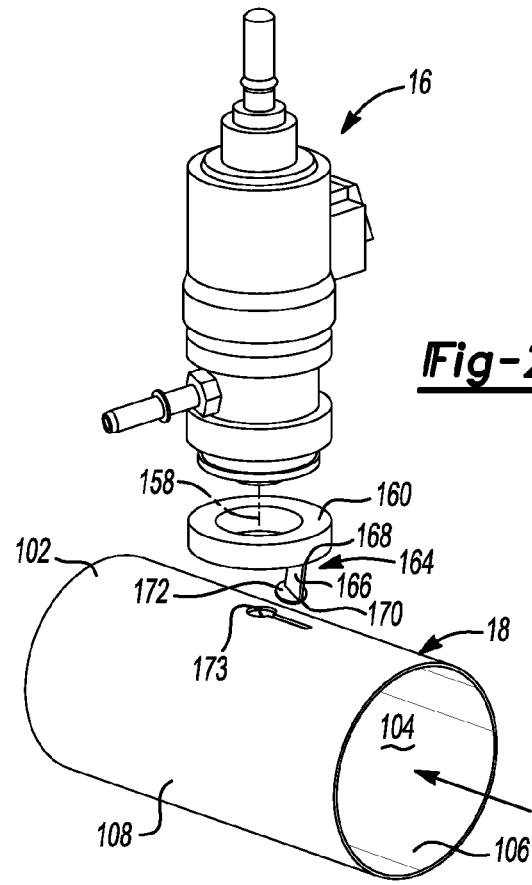
FIG. 2 is an exploded perspective view of an exhaust gas treatment device including a pre-injection exhaust flow modifier.

With reference to the Figures, a pollution control system 8 for reducing $NO_x$ emissions from the exhaust of a diesel engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system and can be used singly or in combination. The tank 10 and delivery module 12 may form an integrated reagent tank/delivery module. Also provided as part of system 8 is an electronic injection controller 14, a reagent injector 16, and an exhaust system 19. Exhaust system 19 includes an exhaust conduit 18 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, exhaust gas temperature, exhaust gas flow, engine fuel injection timing, desired $NO_x$ reduction, barometric pressure, relative humidity, EGR rate and engine coolant temperature. A $NO_x$ sensor or meter 25 is positioned downstream from catalyst bed 17. $NO_x$ sensor 25 is operable to output a signal indicative of the exhaust $NO_x$ content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

Referring now to FIGS. 2-8, an exhaust gas treatment assembly 100 is defined to include exhaust conduit 18 and injector 16. Exhaust conduit 18 includes a substantially cylindrical tube 102 defining an exhaust passageway 104. Cylindrical tube 102 includes an inner surface 106 and an outer surface 108.

Injector 16 includes a body 150 defining a cylindrical chamber 152 in receipt of an axially translatable valve member 154. Body 150 includes an exit orifice 156 as a discharge location for injected reagent. A valve seat 146 is formed proximate exit orifice 156 that is selectively engaged by valve member 154 to control reagent injection into the exhaust gas flow path. Valve member 154 is translatable along an axis of reagent injection 158.

A mount 160 is fixed to body 150 and includes a radially outwardly extending flange 162. A flow modifier 164 radially inwardly extends from mount 160 into tube 102 to change the direction of exhaust flow through exhaust passageway 104. A clamp (not shown) or some other suitable coupling device fixes mount 160 to tube 102.

Flow modifier 164 includes a radially inwardly extending post 166 having a first end 168 fixed to mount 160 and an opposite end 170 fixed to a substantially planar diverter plate 172. Diverter plate 172 is positioned at an inclined angle to a direction of exhaust flow passing through tube 102. In the embodiment depicted in FIG. 2, diverter plate 172 includes an elongated oval outer shape.

Flow modifier 164 and mount 160 are shown as a one-piece member that may easily be fixed to tube 102 using typical injector mounting hardware. It is also contemplated that flow modifier 164 may be spaced apart from mount 160, positioned within exhaust passageway 104, and separately fixed to cylindrical tube 102. In the version depicted in FIG. 2, tube 102 includes a keyhole slot 173 shaped to receive flow modifier 164.

Figure 3:
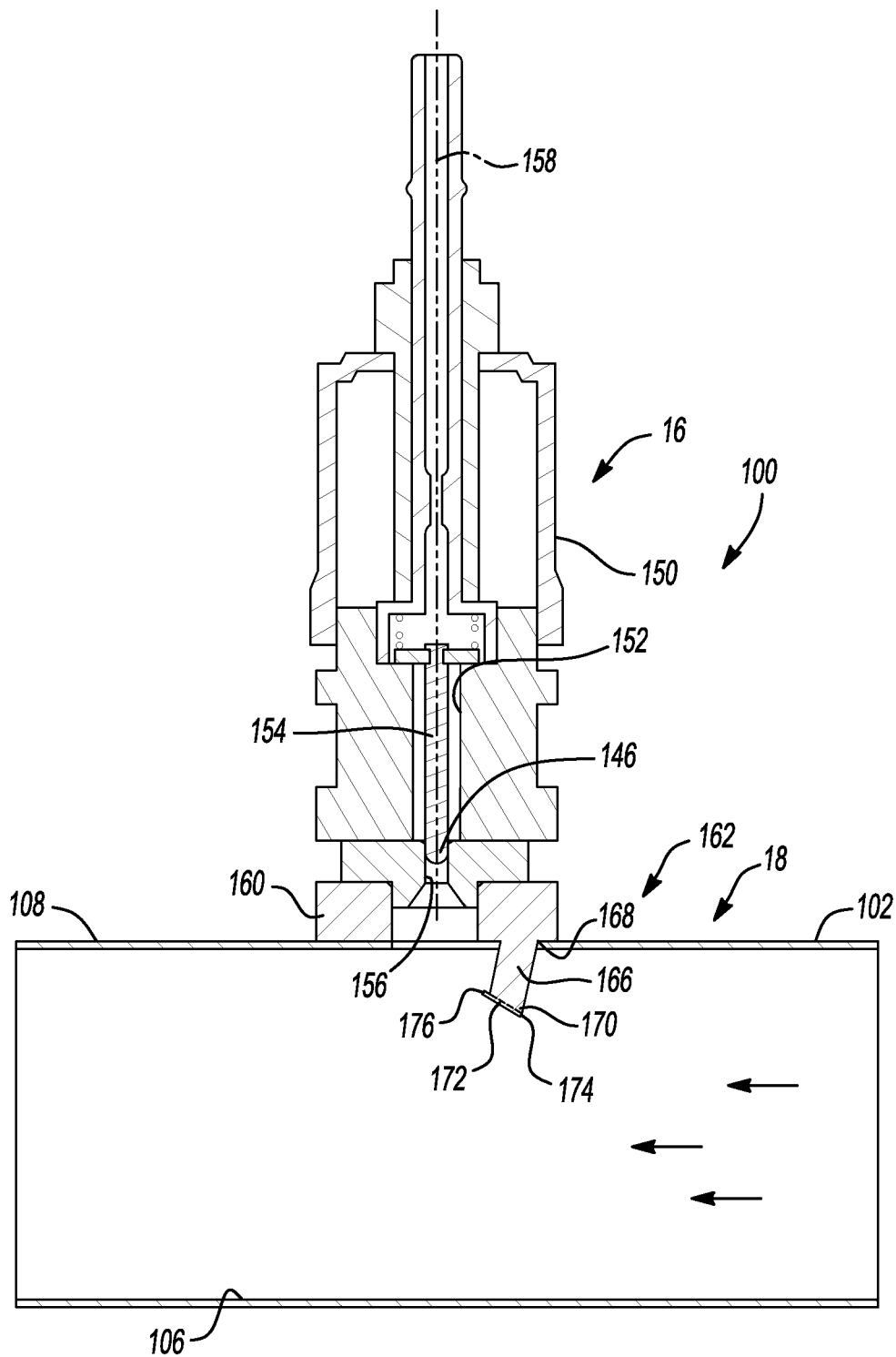
FIG. 3 is a fragmentary cross-sectional side view of the exhaust gas treatment device.
Figure 4:
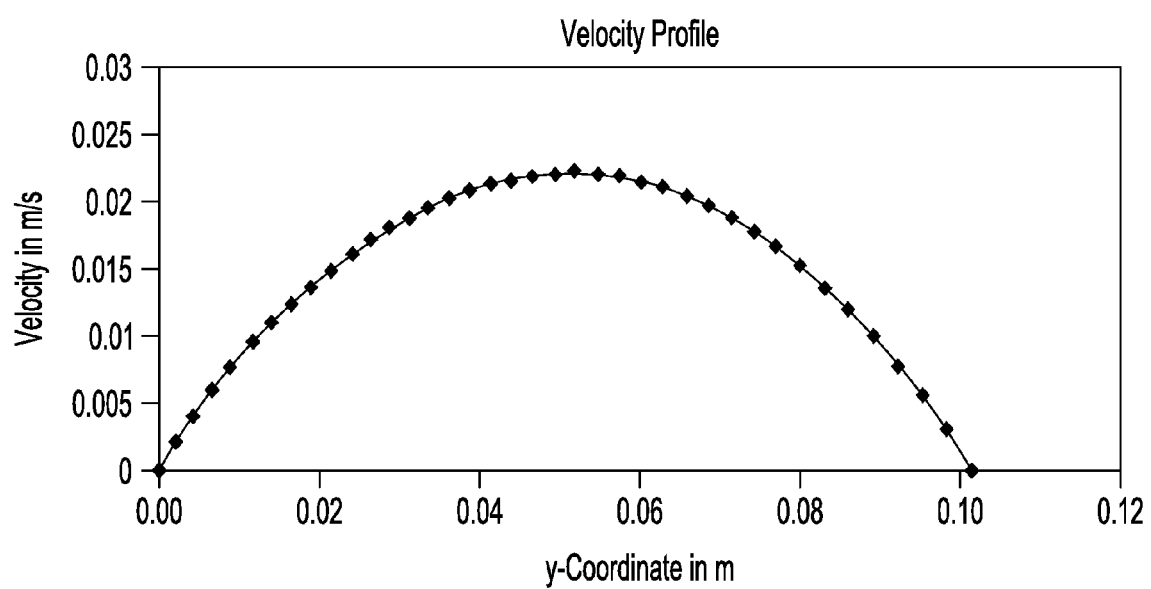
FIG. 4 is a graph depicting an exhaust gas velocity profile through a conduit that is not equipped with a pre-injection modifier.

Flow modifier 164 is positioned upstream from axis of reagent injection 158. Flow modifier 164 is sized, shaped and positioned within passageway 104 to change the velocity profile of the exhaust at a cross-sectional plane taken along reagent injection axis 158. In the absence of a flow modifier, the exhaust flow velocity profile flowing through tube 102 exhibits a substantially symmetrical curved trace increasing to a maximum velocity at the center of passageway 104 with minimal velocity at inner surface 106, as shown in FIG. 4. The velocity of the exhaust gas near inner surface 106 is substantially lower than the exhaust gas velocity in the center of tube 102. When the exhaust flow rate is relatively low, such as when the internal combustion engine is idling, injected reagent tends to pass through the exhaust gas and impinge on inner surface 106 along the lower half of tube 102 (FIG. 3). As previously mentioned, it is desirable to mix the reagent with the exhaust gas and supply the mixture to an exhaust treatment device such as an SCR catalyst. Reagent that impinges on inner surface 106 may tend to adhere to tube 102 causing undesirable pooling, corrosion and possible reagent solidification.

FIG. 5 depicts a computational fluid dynamics contour illustrating a reagent mass fraction distribution during an injection of approximately 4.2 grams per minute with a relatively low exhaust flow rate of approximately 380 kg per hour for an exhaust system without a flow modifier. A simulated reagent spray concentration contour plot is also provided at FIG. 6 for the same exhaust flow rate and reagent injection rate. Both of the plots of FIGS. 5 and 6 relate to exhaust flow and reagent injection within a cylindrical tube without a flow modifier.

FIG. 7 depicts a mass fraction of reagent contour for the same exhaust flow and reagent injection rates for a system equipped with a flow modifier shaped as diverter plate 172. A corresponding reagent spray concentration contour is shown at FIG. 8. A comparison of the contours generated without a flow diverter and the contours including diverter plate 172 illustrate the effect of increasing the exhaust velocity near reagent exit orifice 156. By increasing the velocity at the area where the reagent is initially injected, droplets of reagent are forced upwardly and/or further downstream prior to traversing the tube and impinging inner surface 106 opposite injector 16.

Additional computational estimates were generated regarding the concentration of injected reagent throughout passageway 106. In particular, an amount of reagent deposited on the lower half of the pipe wall surface was estimated at the 380 kg per hour exhaust flow rate with the reagent injection rate of approximately 4.2 g per minute. By installing flow modifier 164, the mass fraction of reagent deposited on the lower half of inner surface 106 was reduced more than 50 percent.

Further review of the computational fluid dynamics data reflects diverter plate 172 causing a flow separation at a leading edge 174 urging the exhaust flow to accelerate toward injector 16. At a trailing edge 176 of diverter plate 172 the exhaust flow velocity is increased by 25 percent in the area between diverter plate 172 and injector 16. Enhanced mixing and reduced reagent impingement results.

Figure 9:
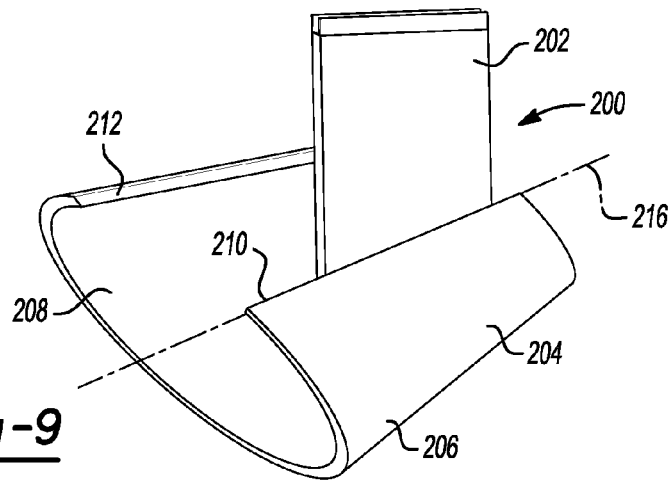
FIG. 9 is fragmentary perspective view of a semi-cone flow modifier.

FIG. 9 depicts an alternate flow modifier 200. As previously discussed in relation to flow modifier 164, flow modifier 200 may be fixed to an injector mount or may be separately spaced apart from injector 16 and coupled to tube 102. Flow modifier 200 includes a post 202 having a substantially planar shape radially extending into passageway 104. A semi-cone flap 204 is fixed to post 202. Semi-cone flap 204 includes a partially conically shaped outer surface 206 spaced apart from a partially conically shaped inner surface 208. Semi-cone flap 204 terminates at a first edge 210 and a second edge 212. First edge 210 is spaced apart from second edge 212 to allow post 202 to pass therebetween. An axis of rotation 216 of outer conical surface 206 extends at an angle to the direction of exhaust flow through passageway 104 to increase the velocity of the exhaust flow near injector 16. CFD analysis indicates favorable reagent and exhaust mixing as well as reduced reagent impingement on inner surface 106 opposite injector 16.

Figure 10:
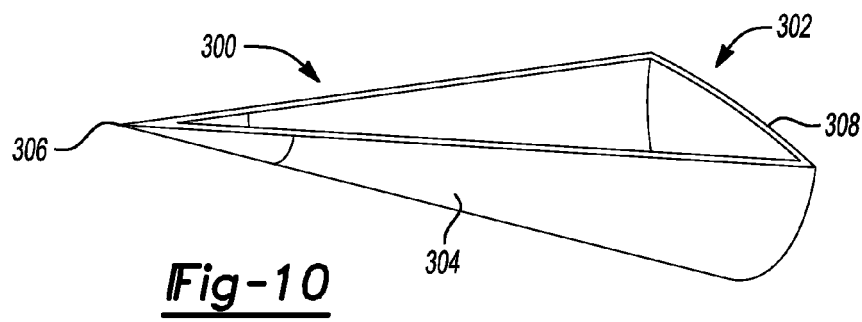
FIG. 10 is fragmentary perspective view of a wedge flap flow modifier.

Another alternate flow modifier is identified at reference numeral 300 as shown in FIG. 10. Flow modifier 300 includes a wedge-shaped flap 302 inwardly protruding from inner surface 106 upstream from injector 16. Wedge flap 302 includes a conically shaped wall 304 beginning at a point 306 and terminating at a substantially planar panel 308. Wedge flap 302 also serves to modify the exhaust gas velocity profile upstream from injector 16 to enhance mixing and reduce reagent impingement on inner surface 106.

Figures 11, 12, 13:
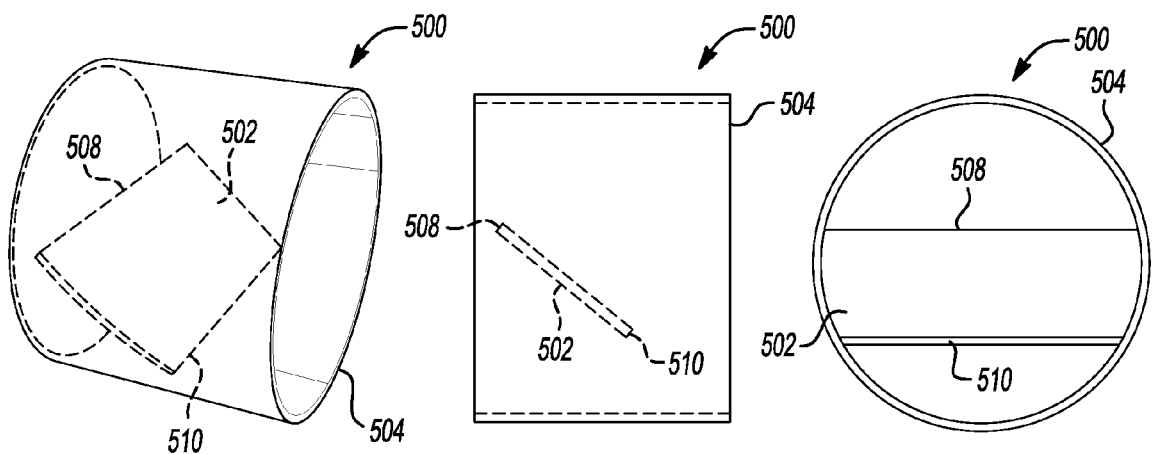
FIG. 11 is fragmentary perspective view of another alternate pre-injection flow modifier.
FIG. 12 is cross-sectional side view of the flow modifier depicted in FIG. 11.
FIG. 13 is an end view of the flow modifier depicted in FIG. 11.

FIGS. 11-13 depict another type of flow modifier identified at reference numeral 500. Flow modifier 500 is shaped as a substantially planar plate 502 fixed within a substantially cylindrical tube 504. Plate 502 is inclined in the opposite direction than that of diverter plate 172. In particular, an upstream edge 508 of plate 502 is positioned closer to injector 16 than a downstream edge 510 of plate 502. Exhaust flow is split as it traverses leading edge 508 such that the top portion of the flow will expand and slow down slightly, while the bottom portion of the flow will compress and cause an increase in velocity. The increased velocity at the lower portion of the pipe will sweep away reagent droplets reaching the lower portion of the pipe before evaporating. Accordingly, flow modifier 500 will reduce pipe wetting due to reagent impingement.

Provided that the angle at which plate 502 resides within tube 504 is steep enough, the top portion of the pipe will experience boundary layer detachment causing turbulence to assist reagent and exhaust mixing. In one embodiment, a post injection mixer such as that depicted in U.S. Patent Application Publication No. US2009/0266064 A1, which is hereby incorporated by reference, may be included. The turbulent flow entering the mixer will enhance the mixer's ability to distribute the reagent throughout the exhaust gas. As such, the mixing length may be shortened. Alternatively, by properly positioning plate 502 upstream from injector 16, a post injection mixer may be eliminated.

Figure 14:
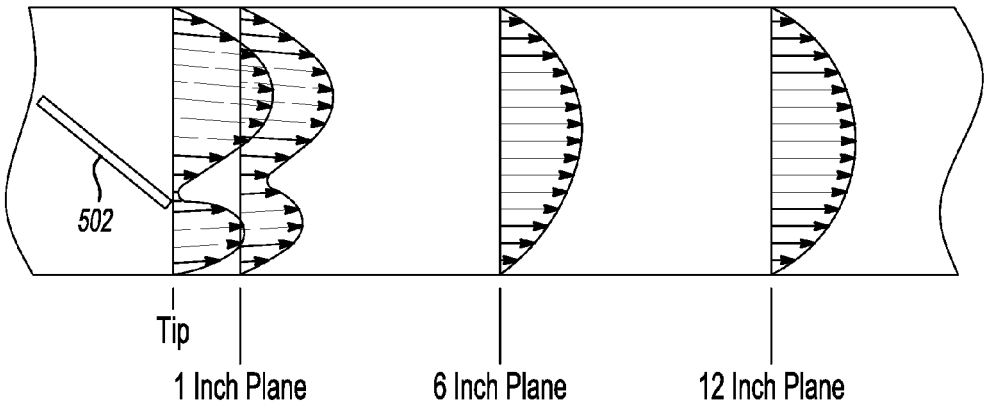
FIG. 14 is a graph depicting a velocity profile for the exhaust travelling through a conduit equipped with the flow modifier shown in FIG. 11.

FIG. 14 presents a velocity profile of the exhaust at four different axial positions downstream from inclined plate 502. The first velocity distribution is plotted at the trailing edge 510 of plate 502. The next profile to the right, as viewed in FIG. 14, depicts the exhaust gas velocity distribution at one inch axial distance downstream from trailing edge 520. The velocity distributions at a six inch offset distance and at a twelve inch offset distance are also shown. Based on the computational fluid dynamic modeling, injector 16 may be beneficially placed at an axial location aligned with trailing edge 510 or within approximately 1 inch of trailing edge 510 to take advantage of the increased velocity profile near inner surface 106 opposite injector 16.

It should also be appreciated that plate 502 may be fixed within tube 504 or may be moveably mounted therein. For the moveably mounted version, it is contemplated plate 502 may be pivotally coupled to tube 504 in a manner similar to the snap-action valve described in U.S. Pat. No. 7,434,570 herein incorporated by reference. Additional moveable valves are described in U.S. Pat. No. 7,775,322, U.S. Patent Application Publication No. US2008/0245063 and U.S. Patent Application Publication No. US2011/0061969 also herein incorporated by reference. Each of the references cited include a torsional spring and a passively actuated valve that rotates in relation to the pressure of the exhaust acting thereon. It is also contemplated that the present flow modifier may be actively controlled through the use of an actuator (not shown) operable to rotate plate 502 between a position substantially parallel to the direction of exhaust flow and the inclined position previously discussed.

Figure 15:
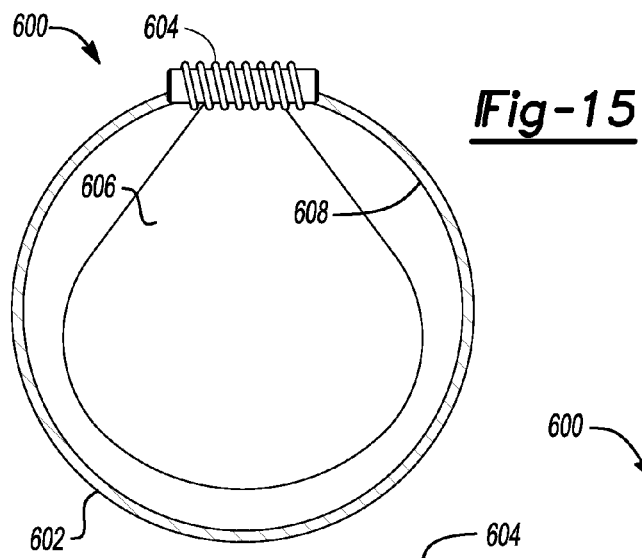
FIG. 15 is a plan view of another alternate flow modifier.
Figure 16:
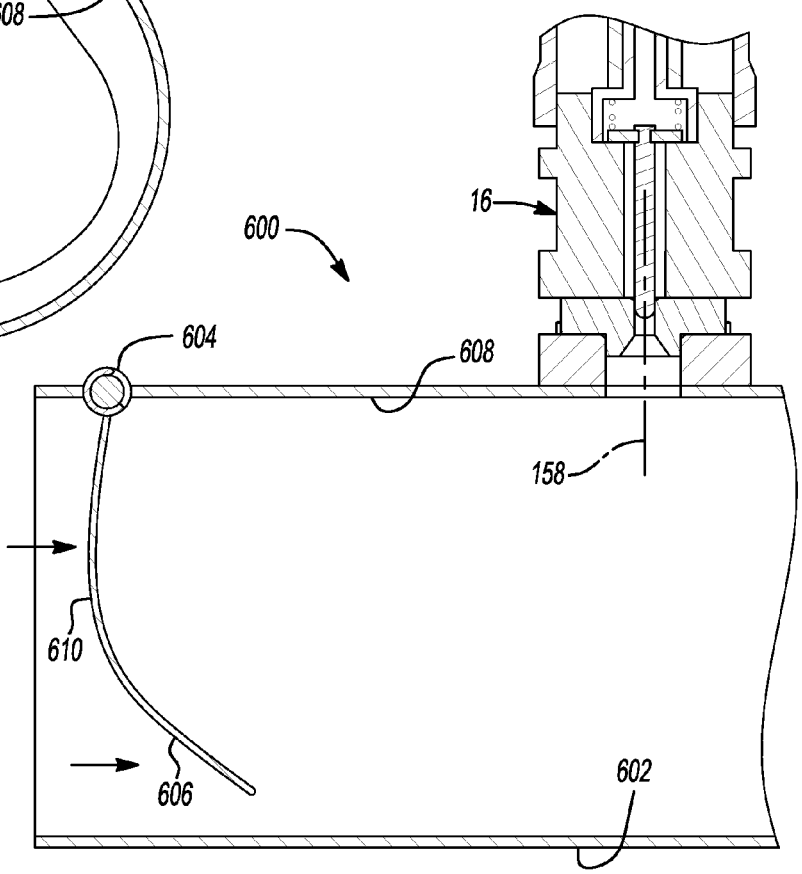
FIG. 16 is a fragmentary cross-sectional side view of the flow modifier shown in FIG. 15.

FIGS. 15 and 16 depict a biased flow modifier 600 pivotally coupled to tube 602. Flow modifier 600 may be moved between deployed and retracted positions to minimize restriction to flow at higher exhaust flow rates. When the exhaust flow rate through tube 102 is sufficiently high, additional flow modification is not required to obtain adequate reagent mixing and avoidance of reagent impingement. At these higher exhaust gas flow rates, it may be beneficial to retract the flow modifier from its deployed position.

A torsion spring 604 biases a flap 606 toward the deployed position depicted in the figures. Flap 606 is curved to deflect exhaust flow away from injector 16 and increase the exhaust velocity adjacent inner surface 608 opposite injector 16. When the exhaust flow rate reaches a predetermined magnitude, the force on an upstream surface 610 of flow modifier 600 overcomes the biasing force of spring 604, thereby causing flap 606 to move toward the retracted position adjacent inner surface 608. When flow modifier 600 is in the retracted position, restriction to exhaust flow is minimized. Any increase in back pressure due to the use of flow modifier 600 will be minimized.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust gas treatment system for reducing emissions from an engine, the system comprising:
   an exhaust treatment device;
   an exhaust conduit adapted to supply an exhaust stream from the engine to the exhaust treatment device, the conduit including an aperture;
   an injector for injecting a reagent through the aperture and into the exhaust stream;
   a flow modifier positioned within the exhaust conduit upstream of the injector, the flow modifier including a diverter for increasing the velocity of the exhaust gas at a predetermined location within the conduit relative to the injected reagent, the diverter including a substantially planar member spaced apart from an inner surface of the conduit, the planar member being inclined to direct exhaust toward the injector; and
   a mount fixing the injector to the conduit and a post extending through the aperture interconnecting the planar member and the mount.

2. An exhaust gas treatment system for reducing emissions from an engine, the system comprising:
   an exhaust treatment device;
   an exhaust conduit adapted to supply an exhaust stream from the engine to the exhaust treatment device, the conduit including an aperture;
   an injector for injecting a reagent through the aperture and into the exhaust stream;
   a flow modifier positioned within the exhaust conduit upstream of the injector, the flow modifier including a diverter for increasing the velocity of the exhaust gas at a predetermined location within the conduit relative to the injected reagent, wherein the diverter includes a conically-shaped surface positioned such that a larger diameter portion of the conically-shaped surface is upstream of a smaller diameter portion, and further wherein the conically-shaped surface is interrupted to define spaced apart edges; and
   a post extending between the spaced apart edges interconnecting the diverter and the conduit.

3. The exhaust gas treatment system of claim 1, wherein the predetermined increased velocity location is substantially at the injection aperture.

4. An exhaust gas treatment system for reducing emissions from an engine, the system comprising:
   an exhaust treatment device;
   an exhaust conduit adapted to supply an exhaust stream from the engine to the exhaust treatment device, the conduit including an aperture;
   an injector for injecting a reagent through the aperture and into the exhaust stream; and
   a flow modifier positioned within the exhaust conduit upstream of the injector, the flow modifier including a diverter for increasing the velocity of the exhaust gas at a predetermined location within the conduit relative to the injected reagent, wherein the diverter includes a substantially planar member spaced apart from an inner surface of the conduit, the planar member being inclined to direct exhaust away from the injector.

5. The exhaust gas treatment system of claim 4, wherein the predetermined increased velocity location is opposite the injection aperture.

6. The exhaust gas treatment system of claim 4, wherein the diverter is fixed at a predetermined angle.

* * * * *